(12) United States Patent
Lozovsky

(10) Patent No.: US 12,196,872 B2
(45) Date of Patent: Jan. 14, 2025

(54) TRACKING MOVING OBJECTS

(71) Applicant: HOOPO SYSTEMS LTD., Ramat-Hasharon (IL)

(72) Inventor: Ilan Lozovsky, Ramat-Hasharon (IL)

(73) Assignee: HOOPO SYSTEMS LTD., Ramat-Hasharon (IL)

( * ) Notice: Subject to any disclaimer, the term of this patent is extended or adjusted under 35 U.S.C. 154(b) by 327 days.

(21) Appl. No.: 17/799,959

(22) PCT Filed: Feb. 18, 2021

(86) PCT No.: PCT/IB2021/051381
§ 371 (c)(1),
(2) Date: Aug. 16, 2022

(87) PCT Pub. No.: WO2021/165874
PCT Pub. Date: Aug. 26, 2021

(65) Prior Publication Data
US 2023/0056181 A1    Feb. 23, 2023

Related U.S. Application Data

(60) Provisional application No. 62/978,855, filed on Feb. 20, 2020.

(51) Int. Cl.
*G01S 5/02*     (2010.01)
*G16Y 10/75*    (2020.01)
*G16Y 20/10*    (2020.01)

(52) U.S. Cl.
CPC ........ *G01S 5/0289* (2013.01); *G01S 5/02585* (2020.05); *G16Y 10/75* (2020.01); *G16Y 20/10* (2020.01); *G01S 5/0252* (2013.01)

(58) Field of Classification Search
CPC ... G01S 5/0289; G01S 5/02585; G16Y 20/10; G16Y 10/75
USPC ......................................................... 342/451
See application file for complete search history.

(56) References Cited

U.S. PATENT DOCUMENTS

2005/0266860 A1*  12/2005  Tamaki ................. G01S 5/0289
                                                          455/456.6
2017/0064667 A1    3/2017  Mycek et al.

FOREIGN PATENT DOCUMENTS

KR      20180046599 A    *  5/2018
WO   WO-2010065886 A1   *  6/2010  ........... A43B 1/0054

* cited by examiner

*Primary Examiner* — Harry K Liu
(74) *Attorney, Agent, or Firm* — AlphaPatent Associates Ltd.; Daniel J. Swirsky

(57) ABSTRACT

A system for analyzing movement of a plurality of objects, including a transceiver, a location and movement estimator, and a group classifier, where the transceiver receives a plurality of information units from the objects, each information unit includes data related to radio signals, the location and movement estimator uses the data to compute movement characteristics for the objects, and the group classifier classifies the objects to coordinated groups according to their movement characteristics.

16 Claims, 7 Drawing Sheets

TRACKING MOVING OBJECTS

FIELD

The invention relates to the field of communication technology in general, and in particular to locating movable objects using IoT technology.

BACKGROUND

Tracking assets is beneficial across a broad cross-section of industries where accurate and real-time information related to the location of each asset is essential. Real-time data on the status of individual items may provide insights that may be used to improve operation efficiency (reducing the time of deviation detection) and reduce overall costs (efforts to locate a lost asset and possible compensation costs).

In some industries, such as cargo shipment (by air, sea and land), tracking the real-time location of assets is crucial to the ongoing operation. An example of assets needed to be tracked in order to ensure proper operation of an airport is the ground support equipment (GSE). GSE is the equipment found usually on the apron, the servicing area by the terminal used to service the aircraft between flights in an airport. The role of the GSE generally involves, among others, cargo loading operations. GSE is used between the time the aircraft arrives at a terminal gate and the time it departs for its next flight therefore speed, efficiency, and accuracy are important in order to minimize the time during which the aircraft remains parked at the gate. Airport GSE comprises a diverse range of vehicles and equipment necessary to service the aircraft during any ground-based operations.

One type of GSE object is a dolly, used for the transportation of loose baggage, oversized bags, mail bags, loose cargo carton boxes, etc. between the aircraft and the terminal or sorting facility. Numerous dollies are connected to a pulling vehicle, such as a tractor or a tug, that can move them between places in the apron. The dollies may be loaded inside the terminal, moved to the apron where they are attached to a tractor that drives them to the aircraft. A single tractor may concurrently move several dollies.

A dolly is frequently attached to, and detached from, other dollies or to a tug, an operation that is not always supervised by the same person. In addition, any tractor can come to pick up any dolly and tug it away, sometimes erroneously. As a result, dollies may get lost and/or misplaced on the apron. Dollies fleet management is an ongoing burden for GSE operator since there are many dollies (thousands) on a large airport apron and finding a specific dolly (or any other GSE) in the apron is not easy.

The transportation of a dolly to the wrong aircraft should be detected as soon as possible since such a mismatch may result in sending the baggage to the wrong destination, or prolonging the time before the takeoff, if the error is detected prior to takeoff and the baggage is to be relocated to the appropriate aircraft.

Constant and reliable visibility of non-motorized equipment (NME) helps to improve productivity and efficiency in ground handling of GSE, to better locate available NMEs for job assignment, and better plan operations such as reallocation of equipment during non-peak hours.

In some airports, battery powered active Radio Frequency Identification (RFID) or Bluetooth Low Energy (BLE) tags are attached to dollies to facilitate their fleet management. The active RFID tags can be detected at up to few dozen meters (depending on the frequency) away in open space from the fixed RFID reader antenna, which can be mounted at the aircraft loading bridges. The RFID tag reports the dolly's facility number as well as the battery and collision status, making management of the RFID tags or BLE beacons tags (and thus the associated dolly) easier.

However, the RFID/BLE solution suffers from drawbacks such as a short transmission range of the tags that obligates dense installation of RFID/BLE readers; continuous operation of the tag that constantly consumes its power; and limitations on the size of the transmission that prevent sending additional information that may help in detecting the location of an RFID/BLE tag installed on a lost GSE. These drawbacks may result in failing to locate a dolly, lost in a remote location that is not covered by RFID/BLE readers.

SUMMARY

There is provided, in accordance with an embodiment of the invention, a system for analyzing movement of a plurality of objects that includes a transceiver, a location and movement estimator and a group classifier. The transceiver receives a plurality of information units from a plurality of objects, each information unit include data related to radio signals. The location and movement estimator uses the data to compute movement characteristics for the objects and the group classifier classifies the objects to coordinated groups according to their movement characteristics.

Further, in accordance with an embodiment of the invention, the data includes physical characteristics of a radio signal and movement characteristics include heading vector, start movement, end movement, velocity, acceleration and deceleration.

Still further, in accordance with an embodiment of the invention, the physical characteristics of the radio signal include received signal strength indicator (RSSI), time of arrival (TOA); differential times of arrival (DTOA); angle of arrival (AOA) and global positioning system (GPS)

Additionally, in accordance with an embodiment of the invention, the location and movement estimator uses a machine learning (ML) package to identify the location of objects using radio signals fingerprints.

Moreover, in accordance with an embodiment of the invention, objects sending GPS signals are attached to towing vehicles and objects sending RSSI signals are attached to dragged equipment.

Further, in accordance with an embodiment of the invention, objects are ground transportation equipment (GSE).

Still further, in accordance with an embodiment of the invention, the system includes a user application to display a location of each object in a map with a visible association between each object and its coordinated group.

Additionally, in accordance with an embodiment of the invention, the system includes a store with information related to a destination group including member objects and a destination, and a group manager configured to identify a member object sending each information unit and compare the destination group with the coordinated group to which the member object belongs.

Moreover, in accordance with an embodiment of the invention, the group manager is configured to detect deviations between the motion of a member object and the motion of its group and provide a notification regarding the deviations.

Furthermore, in accordance with an embodiment of the invention, transceiver is configured to send commands to the objects, the commands include allocated time slots to transmit, allocated time slots to receive, transmission timing, request to send location information and connectivity check.

There is provided, in accordance with an embodiment of the invention, a method for analyzing movement of a plurality of objects. The method includes receiving a plurality of information units from a plurality of objects, each information unit includes data related to radio signals, computing movement characteristics for the objects based on the data and classifying the objects to coordinate groups according to the movement characteristics.

Moreover, in accordance with an embodiment of the invention, the data includes physical characteristics of a radio signal and movement characteristics comprise heading vector, start movement, end movement, velocity, acceleration and deceleration.

Further, in accordance with an embodiment of the invention, the physical characteristics of the radio signal include received signal strength indicator (RSSI), time of arrival (TOA); differential times of arrival (DTOA); angle of arrival (AOA) and global positioning system (GPS).

Additionally, in accordance with an embodiment of the invention objects sending GPS signals are attached to towing vehicles and objects sending any of RSSI, TOA, DTOA, and AOA signals are attached to dragged equipment.

Further, in accordance with an embodiment of the invention, the computing includes using a machine learning (ML) method to identify the location of objects using radio signals fingerprints.

Moreover, in accordance with an embodiment of the invention, objects are ground transportation equipment (GSE).

Additionally, in accordance with an embodiment of the invention, the method includes displaying a location of each object in a map and visibly associating each object to a coordinated group.

Further, in accordance with an embodiment of the invention, the method includes having access to information related to a destination group including member objects and a destination, identifying a member object sending each information unit and comparing the destination group and the coordinated group to which the member object belongs.

Still further, in accordance with an embodiment of the invention, the method of includes detecting a deviation between the motion of a member object and the motion of its group and notifying regarding the deviation.

Moreover, in accordance with an embodiment of the invention, the transceiver is configured to send commands to the objects, the commands include allocated time slots to transmit, allocated time slots to receive, transmission timing, request to send location information and connectivity check.

BRIEF DESCRIPTION OF THE DRAWINGS

The invention will now be described in relation to certain examples and embodiments thereof with reference to the following illustrative drawing figures so that it may be more fully understood. In the drawings.

Figure 1:
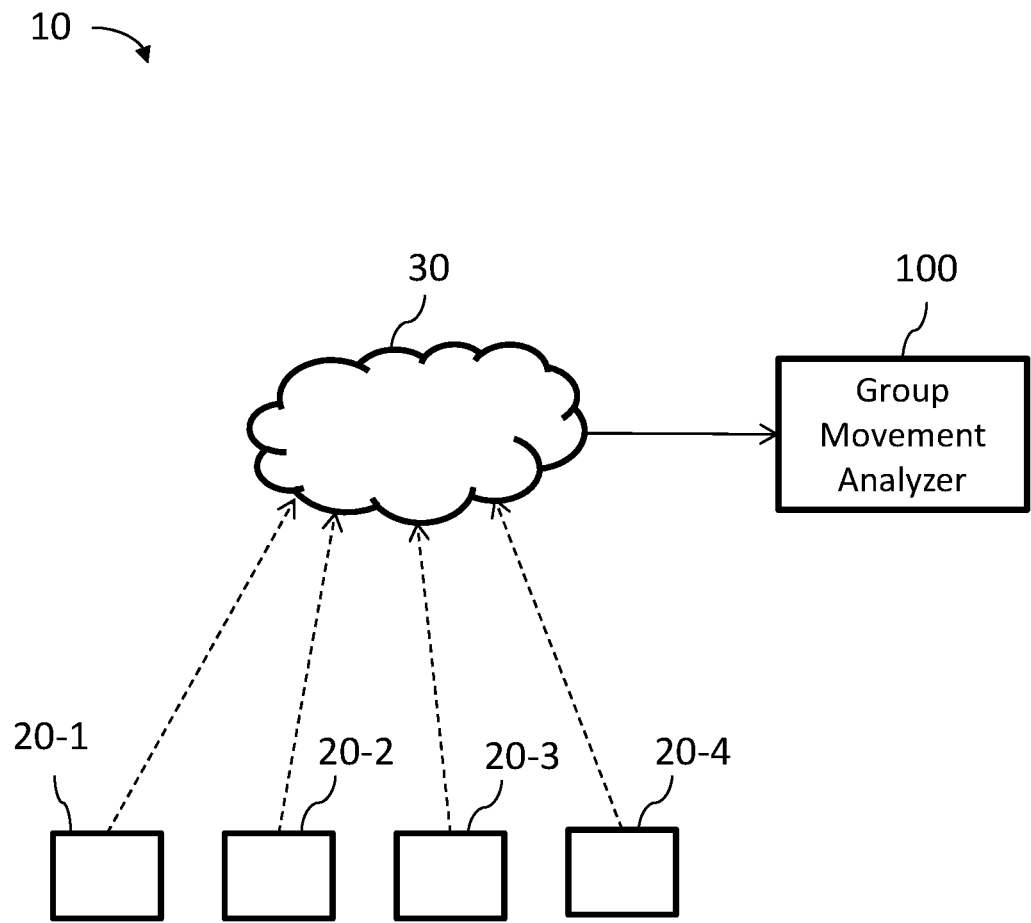
FIG. 1 is a schematic illustration of the ecosystem where a group movement analyzer, constructed and operative in accordance with an embodiment of the invention may be installed.

It will be appreciated that for simplicity and clarity of illustration, elements shown in the drawing figures have not necessarily been drawn to scale. For example, the dimensions of some of the elements may be exaggerated relative to other elements for clarity. Further, where considered appropriate, reference numerals may be repeated among the drawing figures to indicate the same or analogous elements.

DETAILED DESCRIPTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Embodiments of the invention provide systems and methods for identifying coordinated movement of objects and classifying objects to groups based on their coordinated movement. Embodiments of the invention may further detect deviations by identifying changes in the movement pattern, the direction or the location of an object with respect to the group.

Embodiments of the invention utilize cheap and low energy consumption devices (such as those described in international application publication no. WO 2020/188557A1, assigned to the common assignee of the invention) capable of sending information units used by the systems and methods of the invention to identify coordinated movement. These devices may be attached to objects of interest and track their motion in an area of interest.

Systems and methods of the invention, in various embodiments thereof, continuously receive information units sent by the devices, compute movement characteristics (e.g., acceleration, heading vectors and the like) for each object and classify the objects to groups based on detected coordinated movement or synchronized motion of several objects. After a group is established, embodiments of the invention may be able to identify changes and exceptions in the movement/motion pattern, direction or location of any object compared with its group, implying a deviation from the expected motion.

FIG. 1, to which reference is now made, is a schematic illustration of an ecosystem 10 where a group movement analyzer 100 may be installed to provide geo-location information and movement patterns of objects. Ecosystem 10 comprises a set of devices 20 (20-A, 20-B, 20-C and 20-D) each installed on a movable object. Each device 20 is capable of transmitting information units via cloud 30 to group movement analyzer 100.

A device 20 may send information units related to physical characteristics of received radio signals from which group movement analyzer 100 may compute a location. The information units may include received signal strength indicator (RSSI); time of arrival (TOA); differential times of arrival (DTOA); angle of arrival (AOA) and the like.

Additionally, or alternatively, device 20 may compute its location using received radio signals by methods such as global positioning system (GPS) and the like and send the computed location.

Devices 20 may send additional information units related to different aspects of the device such as the device identification details, the device internal state such as its hardware or battery condition, the device motion state such as its velocity and acceleration, the surrounding environmental conditions such as humidity, temperature and light and any other information that may be sensed by a sensor attached to device 20.

Group movement analyzer 100 may use the received information to determine the location of each object on which a device 20 is installed, to compute movement patterns (such as heading vectors, motion starting and ending points, acceleration and deceleration and the like) of each object, to identify all objects moving in a coordinated manner and create groups of objects having a synchronized movement. A group of objects moving in a coordinated manner is referred herein as a coordinated group.

Figure 2:
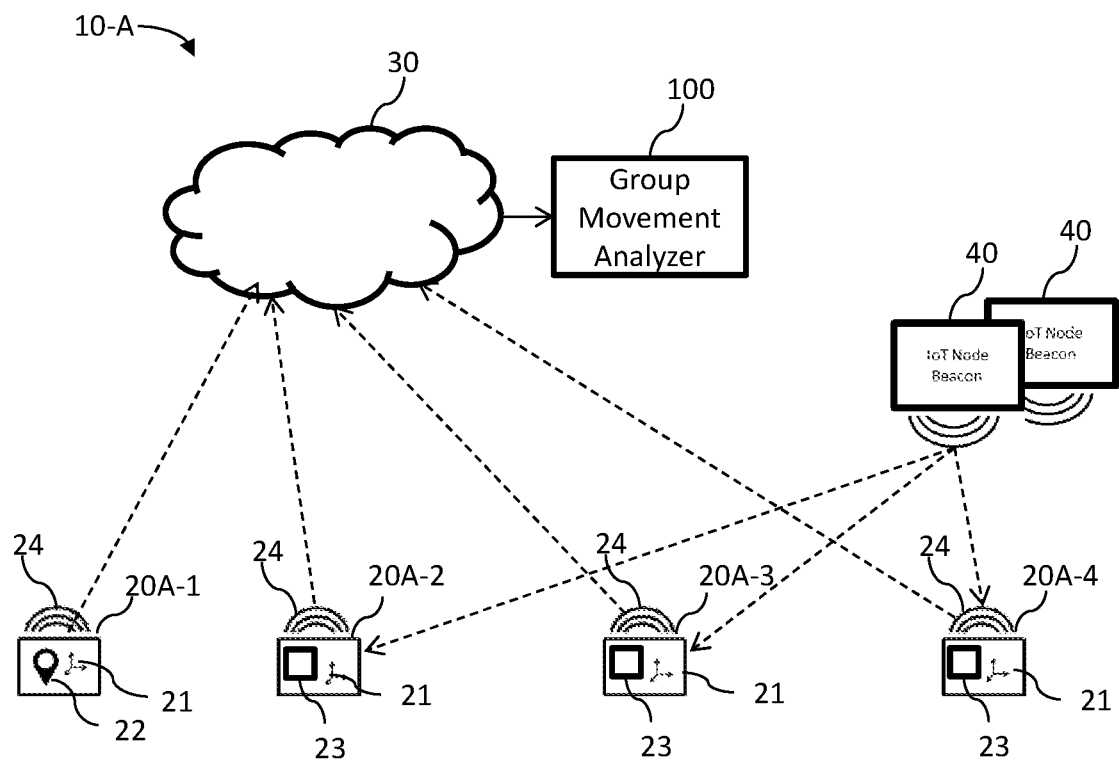
FIG. 2 is a schematic illustration of an exemplary ecosystem.

FIG. 2, to which reference is now made, is a schematic illustration of an exemplary ecosystem 10-A that comprises a set of devices 20A (20A-1, 20A-2, 20A-3 and 20A-4) installed on movable objects, communicating with stationary IoT nodes 40, installed in the area of interest, and with group movement analyzer 100 via cloud 30.

IoT nodes 40, described in international application publication no. WO 2020/188557A1, include an IoT gateway module able to transmit at least a unique ID and an IoT device module able to receive at least a unique ID, compute an RSSI and transmit the RSSI associated with the ID. IoT nodes 40 may be used as stationary objects and installed in pre-determines locations and may be configured to work as beacons periodically transmitting their ID.

Each device 20A comprises, among other sensors, an accelerometer 21, a location sensor such as GPS 22 or IoT device 23 or any other sensor capable of providing information from which a location may be estimated and a radio transceiver 24.

Radio transceiver 24 of device 20A-1, equipped with GPS 22, may receive GPS information, calculate its location and transmit it to group movement analyzer 100 via cloud 30. Radio transceiver 24 of device 20A-2, equipped with IoT device 23, may receive the ID transmitted by IoT nodes 40, compute an RSSI associated with each received transmission and transmit the computed RSSI with the ID of the transmitting IoT node 40 to group movement analyzer 100 via cloud 30.

Figure 3:
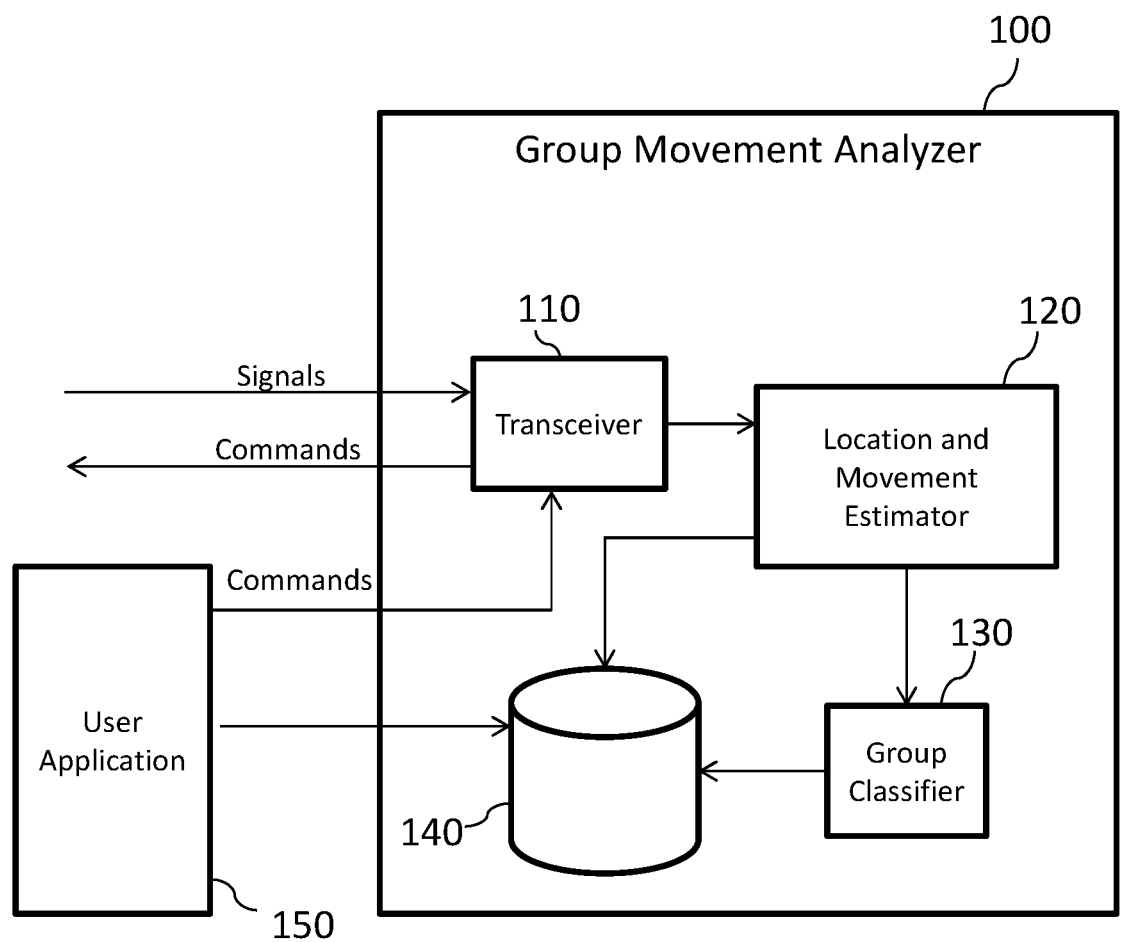
FIG. 3 is a schematic illustration of group movement analyzer constructed and operative in accordance with an embodiment of the invention.

FIG. 3, to which reference is now made, is a schematic illustration of group movement analyzer 100, constructed and operative in accordance with an embodiment of the invention. Group movement analyzer 100 comprises a transceiver 110, a location and movement estimator 120, a group classifier 130, a store 140 and a user application 150.

Transceiver 110 may continuously receive and send information units from and to objects located in ecosystems 10 and 10-A. The information units received from movable objects 20 may include physical characteristics of radio signals and/or GPS information. Transceiver 110 may transmit commands to both movable and stationary objects. The commands sent by transceiver 100 may include management information; operational information; information requests; connectivity checks and any other command that may assist in the operation of ecosystems 10 and 10-A.

The management information may include allocated time slots to transmit, allocated time slots to receive and the like. The operational information may include transmission timing constraints such as "transmit only while in movement", "transmit only as a result of a motion change such as start, stop, acceleration, deceleration" and the like. The information requests may include request to send location information. The connectivity check commands may include a "ping" utility.

Location and movement estimator 120 may compute the location and movement characteristics (e.g., heading vector) of each movable object using the received information units that may include data such as physical characteristics of radio signals received by movable objects 20 (and 20A) processed and sent via cloud 30. The computation may include the method described in international application publication no. WO 2017/122206, assigned to the common assignee of the invention.

Location and movement estimator 120 may utilize machine learning (ML) practices to identify the location of object 20 (and 20A). For example, a location of an object 20 may be estimated using a supervised learning system trained to use radio signal fingerprints to identify the location of an object in ecosystems 10 and 10-A.

Group classifier 130 may classify movable objects 20 (and 20A) to coordinated groups according to their movement characteristics, their location and optionally other information captured by their sensors and received by transceiver 110.

Group classifier 130 may use data related to movable objects 20 (and 20A) such as movement starting time, movement stopping time, location, velocity, acceleration, direction, heading vector and the like to classify objects 20 (and 20A) and may join objects 20 having data indicating coordinated movement to a same coordinated group.

Store 140 may keep data related to objects, both movable objects 20 and stationary objects 40, and related to the identified coordinated groups. Objects' data may include raw data (e.g., received and/or sent signals), computed information per object (e.g., location and heading vectors) time-series per movable object and the like. In addition, store 140 may keep data related to each coordinated group identified by group classifier 130. The coordinated group related data may include the group formation time, the group location, group direction, group velocity and acceleration, the identification of the objects in the group and the like.

User application 150 may provide a user interface to manage stationary objects 40 and movable objects 20 (and 20A). In addition, user application 150 may display the location of movable objects 20 (and 20A) in a map of the area covered by ecosystems 10 and 10-A with a visibly association of objects to coordinated groups using for example the same distinct mark to indicate objects belonging to the same coordinated group.

Figure 4:
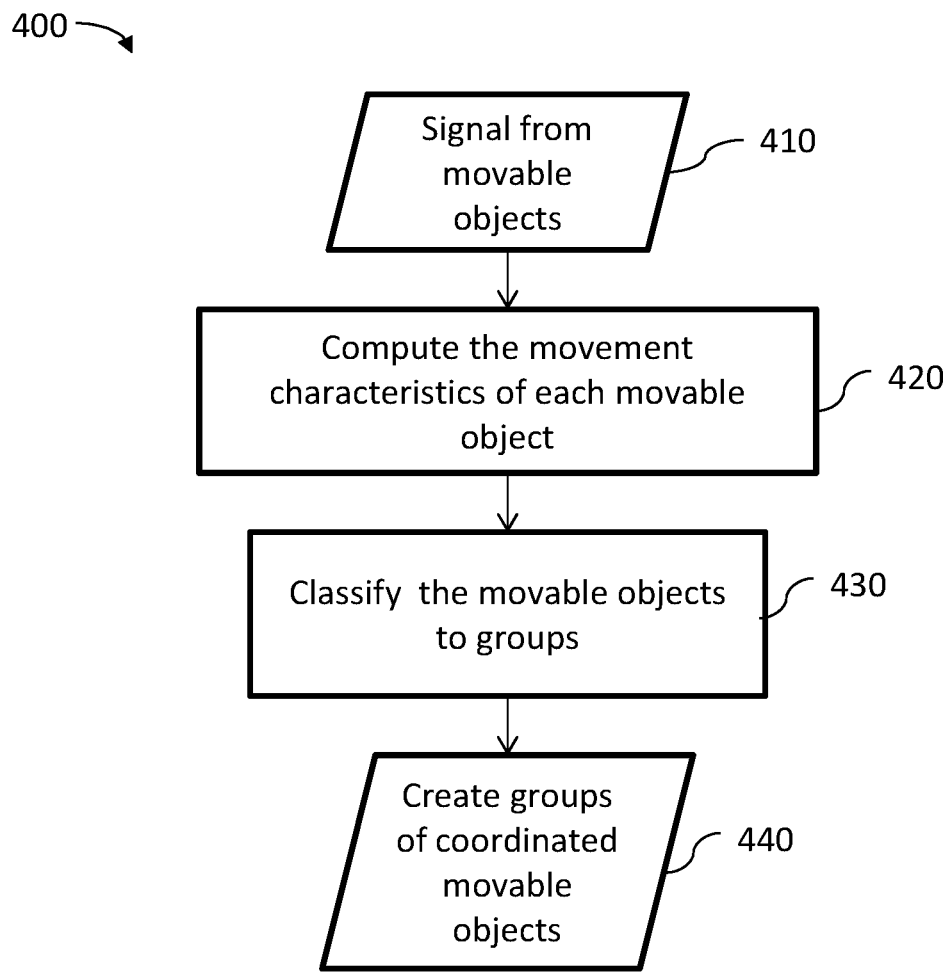
FIG. 4, is a schematic illustration of a flow implemented by group movement analyzer of FIG. 3.

FIG. 4, to which reference is now made, illustrates flow chart 400, implemented by an embodiment of group movement analyzer 100. In step 410, transceiver 110 may receive signals from movable objects 20 (and 20A). In step 420, location and movement estimator 120, may compute movement characteristics (e.g., movement start time, movement stop time, acceleration and heading vector and the like) of each movable object 20 (and 20A). In step 430, group classifier 130 may classify movable objects 20 (and 20A) to coordinated groups, each coordinated group containing objects moving in a coordinated and synchronized fashion and may keep information related to each coordinated group in store 140 in step 440.

Figure 5:
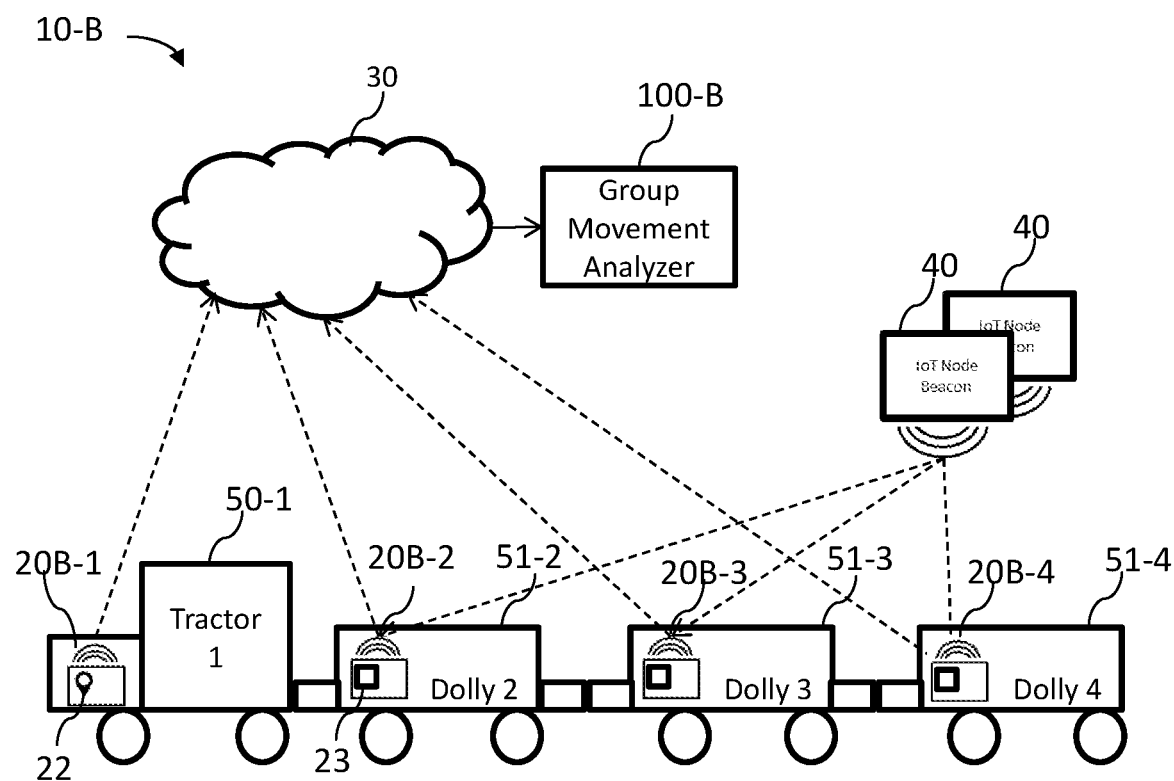
FIG. 5 is a schematic illustration of an exemplary ecosystem in an airport.

FIG. 5, to which reference is now made, is a schematic illustration of an exemplary ecosystem 10-B in an airport where real-time information related to the location of each GSE is needed. It may be appreciated that the airport of FIG. 5 is merely an example of a place where tracking assets is important. However, embodiments of the invention may be installed wherever real-time information related to the location and movement of assets is needed. Information related to the relative location and movement of an asset with respect to other assets may be needed in places where movable assets are used such as harbors, central train stations, hospitals and the like.

Ecosystem 10-B, like ecosystem 10-A of FIG. 2 comprises uniquely identified stationary IoT beacon nodes 40, communicating with uniquely identified movable devices 20B installed on either a towing vehicle 50 or a dragged equipment 51. Movable devices 20B communicate with group movement analyzer 100-B via cloud 30.

Devices 20B of ecosystem 10-B, like devices 20A of FIG. 2, include at least an accelerometer 21 and a radio transceiver 24. Devices 20B, equipped also with GPS 22, may be installed on towing vehicles such as tractor 50-1 and other devices 20B, equipped also with IoT device 23, may be installed on dragged equipment such as dollies 51 (51-2 51-3 and 51-4). It may be appreciated that towing vehicles 50 and dragged equipment 51 may be found in different places in the airport, both outdoors (e.g., apron) and indoors (e.g., terminal).

Devices 20B (both those equipped with IoT device 23 and those equipped with GPS 22) may transmit either while in movement or following a change in velocity or acceleration, and optionally or alternatively periodically every configurable time.

Group movement analyzer 100-B may receive the transmitted information units and provide, in addition to location and motion information of objects, an indication when an object seems to deviate from an expected movement pattern.

Figure 6:
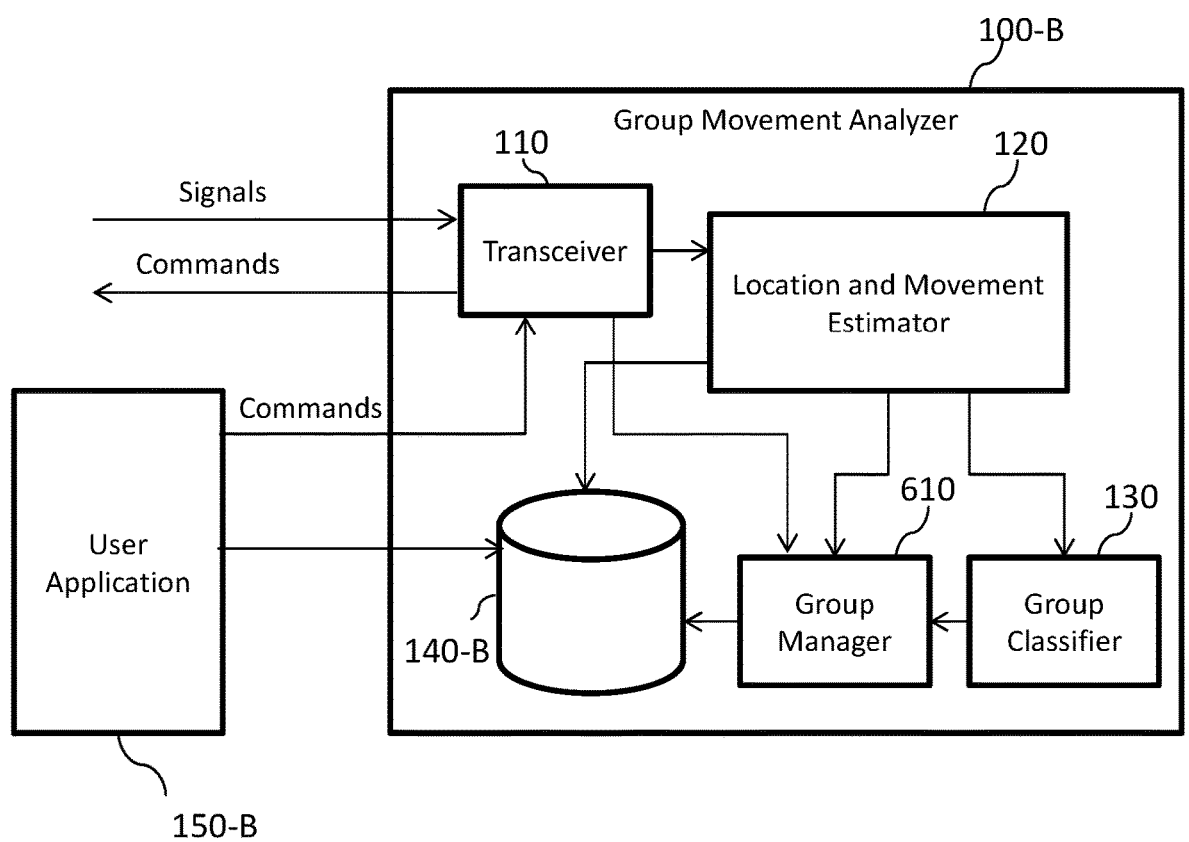
FIG. 6 is a schematic illustration of an alternative embodiment of group movement analyzer with a group manager to manage configured groups constructed and operative in accordance with an embodiment of the invention.

FIG. 6, to which reference is now made, is a schematic illustration of an embodiment of group movement analyzer 100-B, constructed and operative in accordance with an embodiment of the invention. Group movement analyzer 100-B comprises a transceiver 110, a location and movement estimator 120, a group classifier 130 a store 140-B a user application 150-B and a group manager 610.

User application 150-B may provide, in addition to what is provided by user application 150, a user interface to configure and manage numerous destination groups. Each destination group comprises a member of objects, for which a coordinated movement is expected, and a target destination (e.g., the location of a parked aircraft, where the member objects should arrive). Member objects may include towing objects (e.g., the tractor dragging the dollies to the aircraft) and/or dragged object (e.g., dollies that should be delivered to a parked aircraft).

User application 150-B may provide the location of each member object in the map with a clear indication to which coordinated group it belongs and an indication when a member object seems to deviate from its destination group, i.e., when its actual location and/or any another motion characteristic is not aligned with those of its destination group.

Store 140-B may keep (in addition to the information stored in store 140) any information regarding the configured destination groups including the destination and information associated with the member objects.

Group manager 610, constructed an operative in accordance with an embodiment of the invention, may receive information units from location and movement estimator 120 and from group classifier 130. Group manager 610 may identify the identity of the member object associated with the received signal/s and may identify the configured destination group to which the identified member object is associated.

Group manager 610 may compare the coordinated groups (created by group classifier 130) with the configured destination groups and discover deviations between the expected and actual membership of the groups.

Group manager 610 may identify irregularities such as a device located in a location isolated from its configured destination group, a device is moving in an exceptional velocity or acceleration compared with other members of its configured destination group, a device is receiving signals from beacons out of range of the destination group and the like.

Group manager 610 may check whether all member objects of a destination group move together (start moving at the same time and stop moving at the same time), whether all member objects of a destination group move in the same direction (i.e. having a similar heading vector), whether the destination of the objects in the classified coordinated group is aligned with the destination of the configured destination group and may detect any unexpected location or movement direction of a member object and optionally provide a notification regarding the detected deviation.

When all member objects of a destination group are also classified to the same coordinated group, i.e., the actual movement of the objects (as derived from the content of the coordinated groups) is aligned with the expected movement of the objects (as derived from the content of the destination groups) group manager 610 may use and consider information received from several member objects of the same destination group to refine and improve the estimations provided by location and movement estimator 120.

Figure 7:
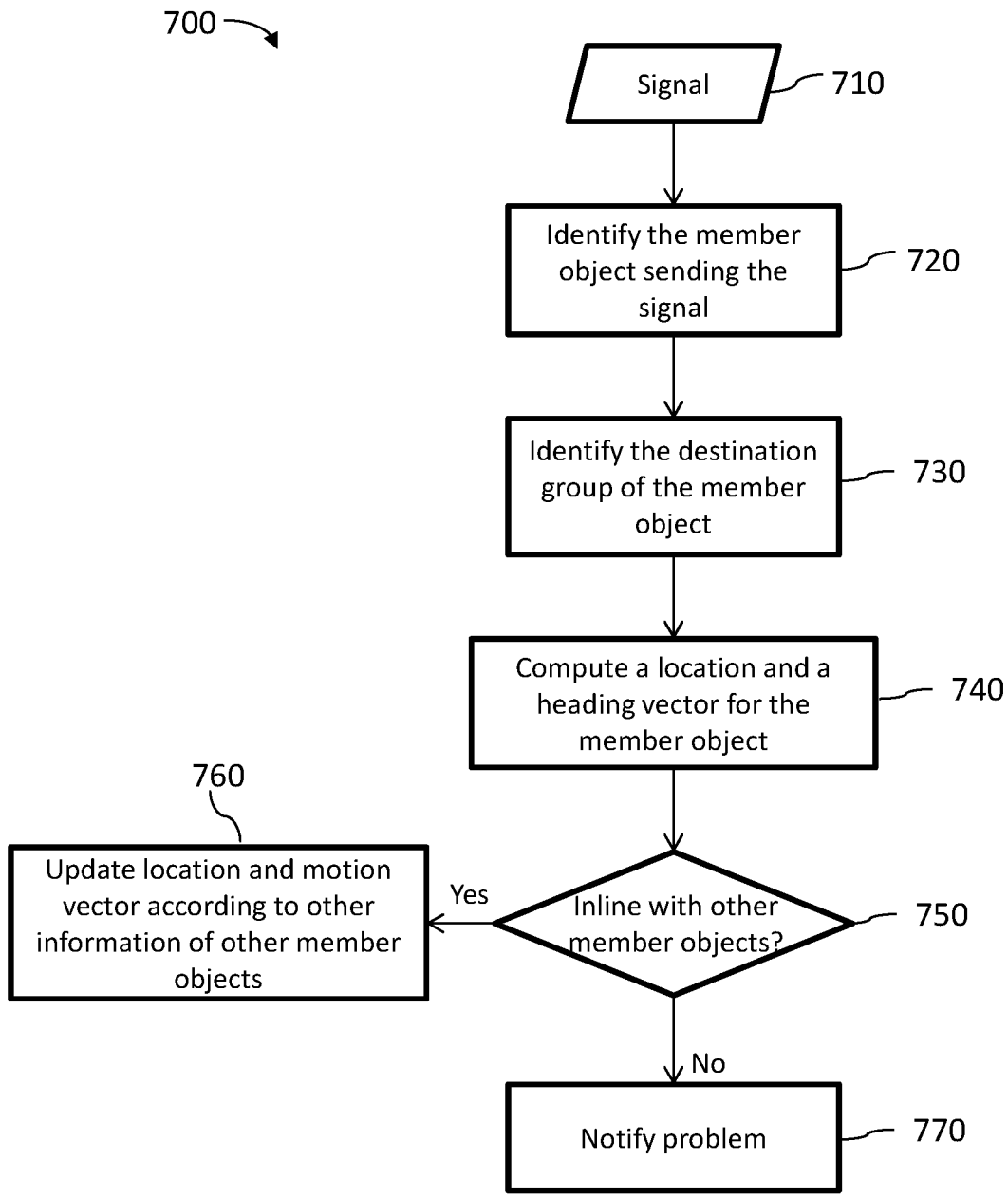
FIG. 7, illustrates a flow implemented by the group movement analyzer of FIG. 7.

FIG. 7, to which reference is now made, illustrates a flow chart 700, implemented by an embodiment of group movement analyzer 100-B. In step 710, transceiver 110 may receive a signal from a device 20B. In step 720, group manager 610 may identify the member object sending the signal. In step 730, group manager 610 may identify the destination group to which the identified member object belongs. In step 740, location and movement estimator 120 may compute a location and a heading vector for the identified member object. In step 750, group manager 610 may check whether the computed information of the member object is in line with other member objects of the same configured destination group. If the member object is in line with other member objects, group manager 610 may, in step 760, update the location and motion vector of the member objects of the coordinated group using the latest receive signals. Otherwise, group manager 610 may, in step 770, create and display and/or send a notification regarding the observed issue.

Embodiments of the invention may provide highly accurate tracking of some of the assets based on information received from other assets configured in the same destination group. Installing low-cost devices, capable of utilizing location related technologies such a GPS and RSSI, on objects of the same destination or coordinated group may provide a cheap and easy to use technique for tracking assets.

In addition, Embodiments of the invention may provide early identification of problems regarding the movement direction of an object (dragged equipment or a towing vehicle) with respect to their classified coordinated group and/or their configured destination group.

Embodiments of the invention may assist in locating lost equipment by providing quick and accurate location of an object located apart from other object of the same destination group and may provide highly accurate prediction of estimated time of arrival (ETA) of an object at the group destination.

Embodiments of the invention may prolong the battery lifetime of the devices attached to the asset and save operation energy by using devices that may be activated by an accelerometer therefore save the battery of GPS devices and IoT nodes that are inactive when at rest and by providing an accurate location estimation of a coordinated group by utilizing only part of the member objects known to be part of the coordinated group moving together.

Embodiments of the invention may be used for locating "things" in a variety of applications such as locating a variety of non-motorized ground equipment (e.g., suitcases) in an airport, locating containers in loading points, locating equipment in locations such as hospitals and factories and the like.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. A system for analyzing movement of a plurality of movable objects, the system comprising:
   a transceiver to receive a plurality of information units from the objects, each information unit comprising data related to radio signals;
   a location and movement estimator to use the data to compute movement characteristics for the objects;
   a group classifier to classify the objects to coordinated groups according to their movement characteristics;
   a store with information related to destination groups, each destination group comprising member objects and a destination; and
   a group manager configured to identify a member object sending each information unit and the destination group of the member object,
   wherein the group manager is configured to
      detect deviations between the motion of a member object and the motion of its destination group, and
      provide a notification regarding the deviations.

2. The system of claim 1 wherein the data comprises physical characteristics of a radio signal and movement characteristics comprise heading vector, start movement, end movement, velocity, acceleration and deceleration.

3. The system of claim 2 wherein the physical characteristics of the radio signal comprises: received signal strength indicator (RSSI), time of arrival (TOA); differential times of arrival (DTOA); angle of arrival (AOA) and global positioning system (GPS).

4. The system of claim 2 wherein the location and movement estimator uses a machine learning (ML) package to identify the location of objects using radio signal fingerprints.

5. The system of claim 3 wherein objects sending GPS signals are attached to towing vehicles and objects sending RSSI signals are attached to dragged equipment.

6. The system of claim 5 wherein objects are ground transportation equipment (GSE).

7. The system of claim 1 and further comprising a user application to display a location of each object in a map with a visible association between each object and its coordinated group.

8. The system of claim 1 wherein the transceiver is configured to send commands to the objects, the commands comprise any of: allocated time slots to transmit, allocated time slots to receive, transmission timing, request to send location information and connectivity check.

9. A method for analyzing movement of a plurality of movable objects, the method comprising:
   receiving a plurality of information units from a plurality of objects, each information unit comprising data related to radio signals;
   computing movement characteristics for the objects based on the data;
   classifying the objects to coordinated groups according to the movement characteristics;
   having access to information related to a destination group comprising member objects and a destination;
   identifying a member object sending each information unit and the destination group of the member object;
   detecting a deviation between the motion of the member object and the motion of its destination group; and
   notifying regarding the deviation.

10. The method of claim 9 wherein the data comprises physical characteristics of a radio signal and movement characteristics comprise heading vector, start movement, end movement, velocity, acceleration and deceleration.

11. The method of claim 10 wherein the physical characteristics of the radio signal comprise: received signal strength indicator (RSSI), time of arrival (TOA); differential times of arrival (DTOA); angle of arrival (AOA) and global positioning system (GPS).

12. The method of claim 11 wherein objects sending GPS signals are attached to towing vehicles and objects sending any of RSSI, TOA, DTOA, and AOA signals are attached to dragged equipment.

13. The method of claim 11 wherein the computing comprises using a machine learning (ML) method to identify the location of objects using radio signal fingerprints.

14. The method of claim 12 wherein objects are ground transportation equipment (GSE).

15. The method of claim 9 and further comprising:
   displaying a location of each object in a map; and
   visibly associating each object to a coordinated group.

16. The method of claim 9 and further comprising sending commands to the objects, the commands comprise any of: allocated time slots to transmit, allocated time slots to receive, transmission timing, request to send location information and connectivity check.

* * * * *